(12) United States Patent
Marton

(10) Patent No.: US 11,137,108 B1
(45) Date of Patent: Oct. 5, 2021

(54) APPARATUS FOR ATTACHING LOCK OR LOCKBOX TO DOOR LEVER

(71) Applicant: Donald Marton, Parkland, FL (US)

(72) Inventor: Donald Marton, Parkland, FL (US)

( * ) Notice: Subject to any disclaimer, the term of this patent is extended or adjusted under 35 U.S.C. 154(b) by 0 days.

(21) Appl. No.: 17/302,768

(22) Filed: May 12, 2021

Related U.S. Application Data

(60) Provisional application No. 63/180,146, filed on Apr. 27, 2021.

(51) Int. Cl.
*F16M 13/02* (2006.01)
*E05B 19/00* (2006.01)

(52) U.S. Cl.
CPC ......... *F16M 13/02* (2013.01); *E05B 19/0005* (2013.01)

(58) Field of Classification Search
CPC ..... F16M 13/02; E05B 19/0005; E05B 73/00; E05B 73/0023; E05G 1/005; E05G 2700/02; E05G 1/00; E05G 1/02; A45C 1/12
USPC ... 70/14, 18, 19, 58, 63, 202, 203, 211, 212, 70/232, 416, 461, 423–428, 455, DIG. 34, 70/DIG. 43, DIG. 56, DIG. 58; 109/50–52; 292/DIG. 2
See application file for complete search history.

(56) References Cited

U.S. PATENT DOCUMENTS

| | | | | |
|---|---|---|---|---|
| 2,133,883 A * | 10/1938 | Hermenegilde | ..... | A63C 11/021 280/814 |
| 2,169,438 A * | 8/1939 | Sherman | ............... | E05B 13/001 70/211 |
| 2,813,620 A * | 11/1957 | Hansen | ............... | E05B 19/0005 70/456 R |
| 3,245,240 A * | 4/1966 | De Forrest | ............ | E05B 13/001 70/209 |
| 3,953,062 A * | 4/1976 | Maston | ................... | E05B 67/38 292/57 |
| 3,999,409 A * | 12/1976 | Bell | ...................... | A63C 11/006 70/58 |
| 4,059,209 A * | 11/1977 | Grisel | .................. | A63C 11/009 294/147 |
| 4,299,361 A * | 11/1981 | Webb | ...................... | B64C 13/14 244/224 |
| 4,418,550 A * | 12/1983 | Hamilton | ............... | E05B 73/007 292/281 |
| 4,463,584 A * | 8/1984 | De Forrest | .............. | E05B 67/38 70/428 |
| 4,532,783 A | 8/1985 | Maurice | | |
| 4,570,470 A * | 2/1986 | Gray, Sr. | ................ | E05B 13/001 70/212 |
| 4,641,505 A | 2/1987 | Maurice | | |

(Continued)

OTHER PUBLICATIONS

Shurlok Lever Grip Website Description, Accessed May 12, 2021.

*Primary Examiner* — Lloyd A Gall
(74) *Attorney, Agent, or Firm* — Brian Roffe

(57) ABSTRACT

Apparatus for attaching a lockbox used for retaining a key to a door opened by the key to a door handle and especially a door lever used to open and close the door. The apparatus includes two arms each having a head portion and a bottom portion below the head portion. The arms have an open state in which the head portions are at least partly separated from one another, and a closed state in which an aperture is defined between the head portions and receives the door handle. The arms are positionable around the door handle or removable from such a position when in the open state. The arms are maintained in the closed state and movement thereof from the closed state to the open state is prevented by inserted a shackle of the lockbox through a staple engaged with both arms.

20 Claims, 6 Drawing Sheets

(56) References Cited

U.S. PATENT DOCUMENTS

| | | | | |
|---|---|---|---|---|
| 4,651,544 | A | * | 3/1987 | Hungerford ........ E05B 19/0005 |
| | | | | 109/48 |
| 4,799,370 | A | * | 1/1989 | Cooper ................ G11B 23/023 |
| | | | | 70/159 |
| 5,046,339 | A | | 9/1991 | Krell |
| 5,193,366 | A | * | 3/1993 | Brinkman ............... E05B 73/00 |
| | | | | 70/178 |
| 5,423,583 | A | * | 6/1995 | Crockom ............. E05B 17/142 |
| | | | | 292/1 |
| 5,590,608 | A | | 1/1997 | Yore et al. |
| 5,664,287 | A | * | 9/1997 | Sendelbach ........... E05B 1/0053 |
| | | | | 16/412 |
| 5,775,149 | A | | 7/1998 | Small |
| 6,018,968 | A | * | 2/2000 | Sides ...................... E05B 67/36 |
| | | | | 292/288 |
| 6,330,816 | B1 | | 12/2001 | O'Connor |
| 6,813,912 | B1 | | 11/2004 | Ng et al. |
| 6,834,519 | B1 | | 12/2004 | Yang |
| 7,204,521 | B2 | * | 4/2007 | Shoen ..................... F16L 35/00 |
| | | | | 285/45 |
| 7,937,975 | B2 | * | 5/2011 | Kolton ................... B60R 25/09 |
| | | | | 70/57.1 |
| 9,670,694 | B2 | | 6/2017 | Larson et al. |
| 10,648,196 | B2 | | 5/2020 | Neau et al. |
| 10,808,427 | B1 | | 10/2020 | Jonak et al. |
| 2011/0226023 | A1 | | 9/2011 | Freeman |
| 2015/0305538 | A1 | * | 10/2015 | Sundaresan ......... E05B 73/0005 |
| | | | | 232/36 |

\* cited by examiner

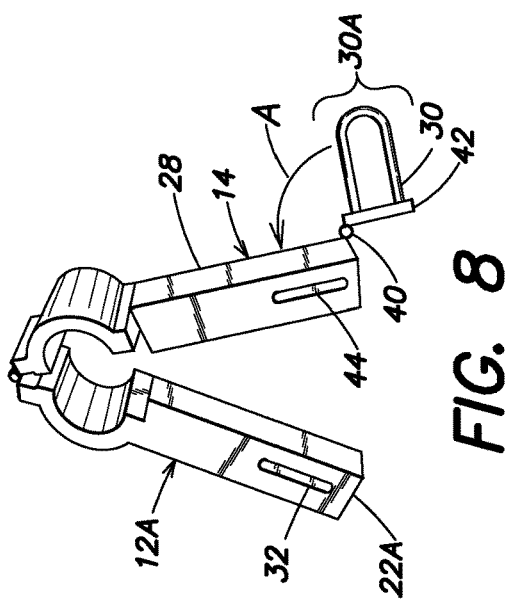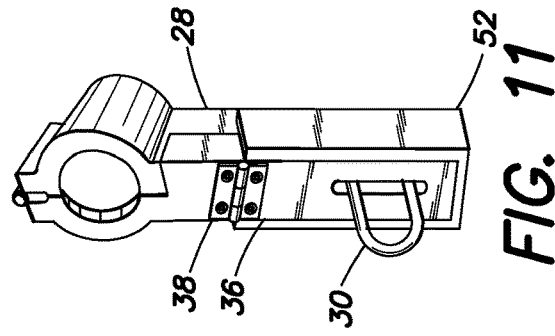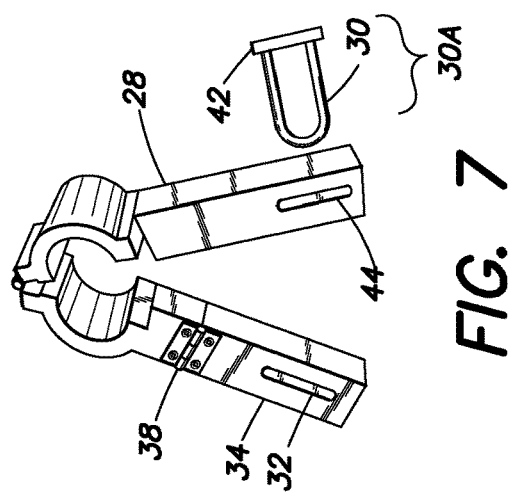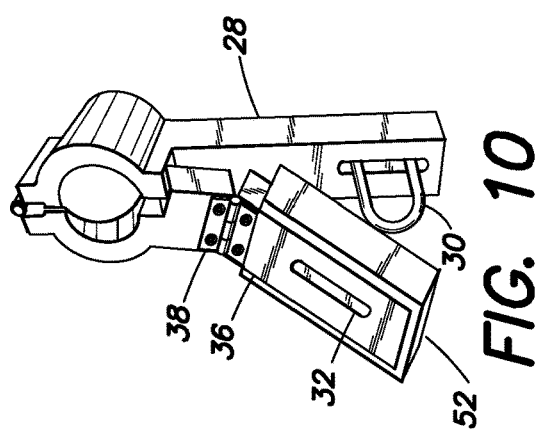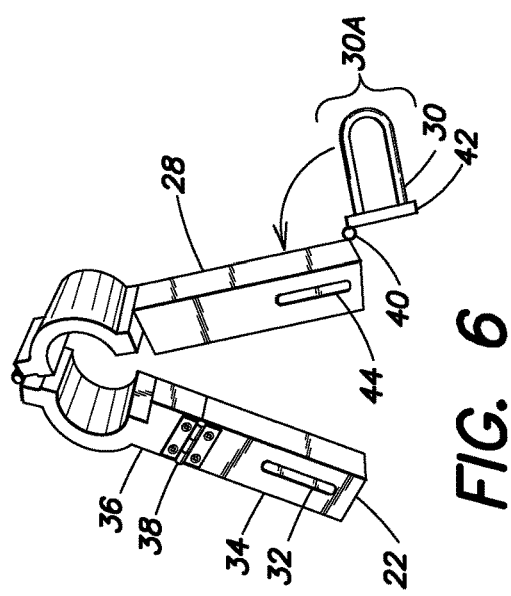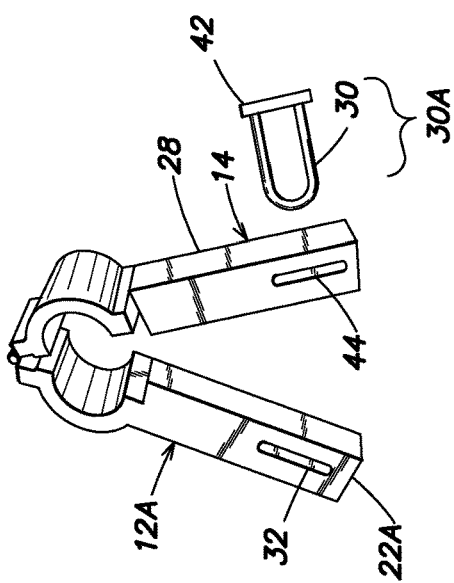

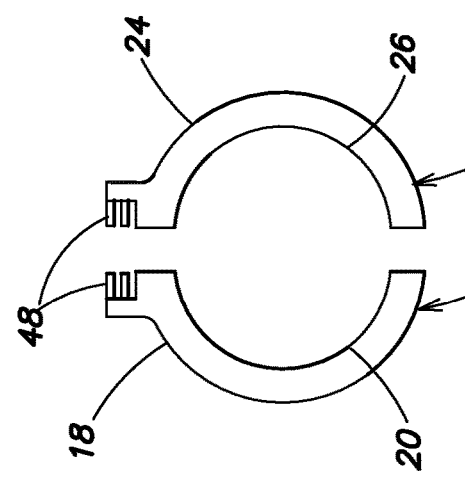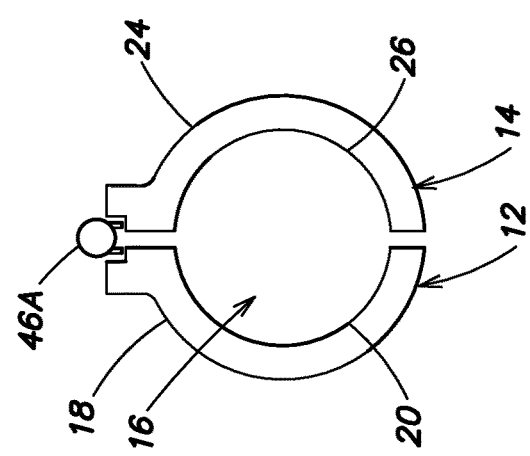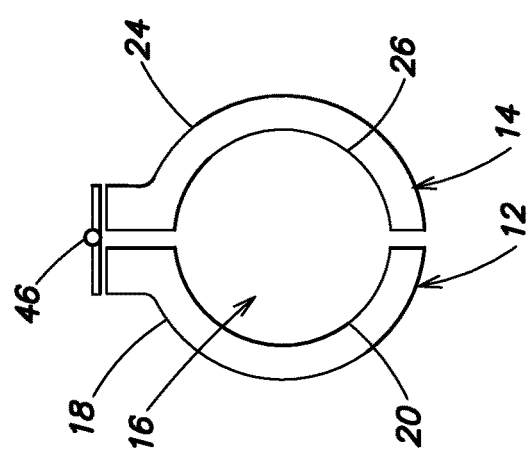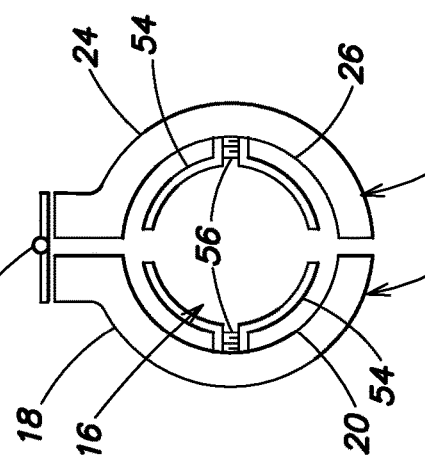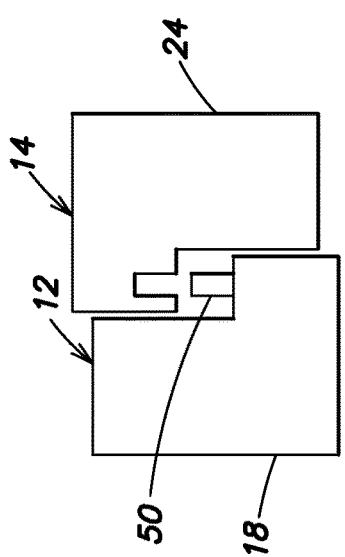

APPARATUS FOR ATTACHING LOCK OR LOCKBOX TO DOOR LEVER

FIELD OF THE INVENTION

The present invention relates generally to an apparatus for attaching a lockbox used for retaining a key to a door opened by the key and more particularly to an apparatus for securely attaching such a lockbox to a door lever used to open and close the door.

BACKGROUND OF THE INVENTION

In the real estate field, it is common practice for realtors to secure a lockbox on the handle of a door of a residence or commercial property they are listing for sale or rent, with the lockbox having a code to open it and access a key stored therein which in turn enables opening of the door to which the lockbox is secured. In this manner, each realtor only has to give the lockbox code to other realtors to enable them to access his or her listed properties and show them to prospective purchasers without being physically present at the listed property or providing the key to the other realtors.

The inventor, the owner of a residential real estate brokerage and a licensed Real Estate Broker for over twenty-five years, has recognized a particular problem with lockboxes used with doors that have door levers (as used herein, a door levers will be considered the horizontal handle that is attached to a door that allows for its opening and closing by manually depressing and pushing or pulling the door lever). Specifically, a door with a door lever is not able to securely retain conventional lockboxes used by realtors. Door levers are open-ended and the shackles of conventional lockboxes, designed to fit around the door knobs, simply slide off the open end of the door lever. Without the ability to secure a lockbox to a door lever, either the agent or property owner has to be present to provide access when prospective purchasers want to view the property.

More specifically, one common lockbox used by realtors is a Master Lock™ portable lockbox with an adjustable shackle that adjusts in approximately 3 mm increments. The incremental tightening of the shackle creates two issues with door levers. First, the shackle does not always tighten enough to securely fashion the lockbox to the door lever. Second, the incremental tightening of the shackle in some scenarios causes tightening to the point where the lockbox cannot hang freely and is forced to move as the door lever is depressed in order to open the door. When the lockbox shackle is forced to move with the depressing of the door lever, the lockbox can be pinned against a door jamb preventing the door lever from being depressed sufficiently to enable opening of the door.

To overcome this problem, instead of attaching the lockbox to the door lever, realtors sometimes attach the lockbox to a less secure location like a hose spigot or fence, but which alternative locations are often not convenient to access.

In addition, the ShurLok Company markets a product designated by product code SL-170 that is considered an attachment to enable the company's lockboxes to be used with door levers. The apparatus has a two-part plastic housing hinged at the bottom and includes an aperture designed to be placed over the door knob. The housing defines a channel over its top and side edges that receives the shackle of the lockbox, and on one side, a projection which defines an aperture through which the shackle passes. There are significant limitations with this attachment that severely impact its usefulness, for example, it fits a lockbox with only one size of shackle, the shackle goes over the door handle not underneath, and if the lockbox shackle is oblong as is typical, the apparatus can be spread open and the lockbox removed. Its plastic construction is also not ideal.

These flaws and disadvantages have been identified by users. Some identified the flexibility of the apparatus as being excessive enabling removal of the shackle and thus the lockbox from the door while the apparatus remains in place. Other complain about its limited use with only specific lockboxes. Overall, it does not provide an acceptable solution to the problem of attaching a lockbox to a door lever and the inventor believes a better solution is needed.

OBJECTS AND SUMMARY OF THE INVENTION

It is an object of at least one embodiment of the present invention to provide an apparatus for attaching a lockbox used for retaining a key to a door opened by the key and more particularly to a door lever of the door.

It is another object of at least one embodiment of the present invention to provide a lockbox assembly configured to attach to a handle of a door, whether a door knob or door lever.

It is another object of at least one embodiment of the present invention to provide a lockbox assembly attachable to a door handle in which the lockbox is secured to an apparatus and the apparatus is secured to the door handle such that no part of the lockbox, and specifically, not its shackle, encompass or surround any part of the door handle.

In order to achieve one of the above objects and/or another object, an apparatus in accordance with the invention includes first and second arms each having a head portion and a bottom portion below the head portion. The arms have a cooperating first, open state in which the head portions are at least partly separated from one another, and a cooperating second, closed state in which an aperture is defined between the head portions. The arms are positionable around a door handle or removable from such a position when in the first, open state and the aperture is receivable of the door handle when the arms are in the second, closed state. The arms are maintained in the second, closed state and movement of the arms from the second, closed state to the first, open state prevented by suitable structure on the first and/or second arm. As such, when the arms are around the door handle, they can be maintained around the door handle. The arms may be connected together when in both the first and second states, but optionally may be completely separated from one another when in the first state.

The structure that enables the arms to be maintained in the second state may be, but is not required to be, a U-shaped staple and a slot in the first arm. The staple extends from the second arm through the slot in the first arm. Movement of the first arm in its entirety relative to the second arm is prevented when the staple passes through the slot. A lock or lockbox, or a shackle thereof, may be inserted through the staple and locked to thereby secure the arms in the closed state.

Another way to view the apparatus in accordance with the invention is that it includes an upper portion defining an aperture configured to fit around a door handle, and a lower portion below the upper portion and including a support for a lock or lockbox (or part thereof) below the aperture. Movement of the upper and lower portions from a closed state to an open state in which the aperture is open is prevented when the lock or lockbox (or part thereof) is supported by the support below the aperture. The upper portion may include a head portion of a first arm and a head portion of a second arm, while the lower portion includes a bottom portion of the first arm below the head portion of the first arm and a bottom portion of the second arm below the head portion of the second arm. As above, the arms have a cooperating first, open state in which the head portions of the arms are at least partly separated from one another, and a cooperating second, closed state in which the aperture is defined between the head portions of the arms. The arms are positionable around the door handle or removable from such a position when in the first, open state and the aperture is receivable of the door handle when the arms are in the second, closed state.

The support may be a U-shaped staple while the lower portion has a slot. The staple extends through the slot to prevent movement of the upper and lower portions from the closed state to the open state. The upper and lower portions may be integral is with one another.

A lockbox assembly in accordance with the invention includes a lockbox having a housing defining a compartment for storing a key, and a shackle partly separable from the housing. The lockbox has any sort of code or code-requiring mechanism or electronic unit that enables access to the compartment. An apparatus to attach the lockbox to a door handle is provided and may be structured as above, e.g., with two arms. The first and/or second arm has structure that engages with the shackle to maintain the arms in the second, closed state and prevent movement of the arms from the second, closed state to the first, open state. Variations of the apparatus include those described above.

BRIEF DESCRIPTION OF THE DRAWINGS

The following drawings are illustrative of embodiments of the system developed or adapted using the teachings of at least one of the inventions disclosed herein and are not meant to limit the scope of the invention as encompassed by the claims.

FIGS. 6-11 show different constructions of parts of the arms of the apparatus, namely, the bottom portions of the arms;

FIGS. 12-15 show different constructions of the head portions of the arms of the apparatus;

FIGS. 16-18 show different constructions of the head portions of the arms to enable adjustment of the size of the hole defined by the head portions.

DETAILED DESCRIPTION OF THE INVENTION

Figure 1:
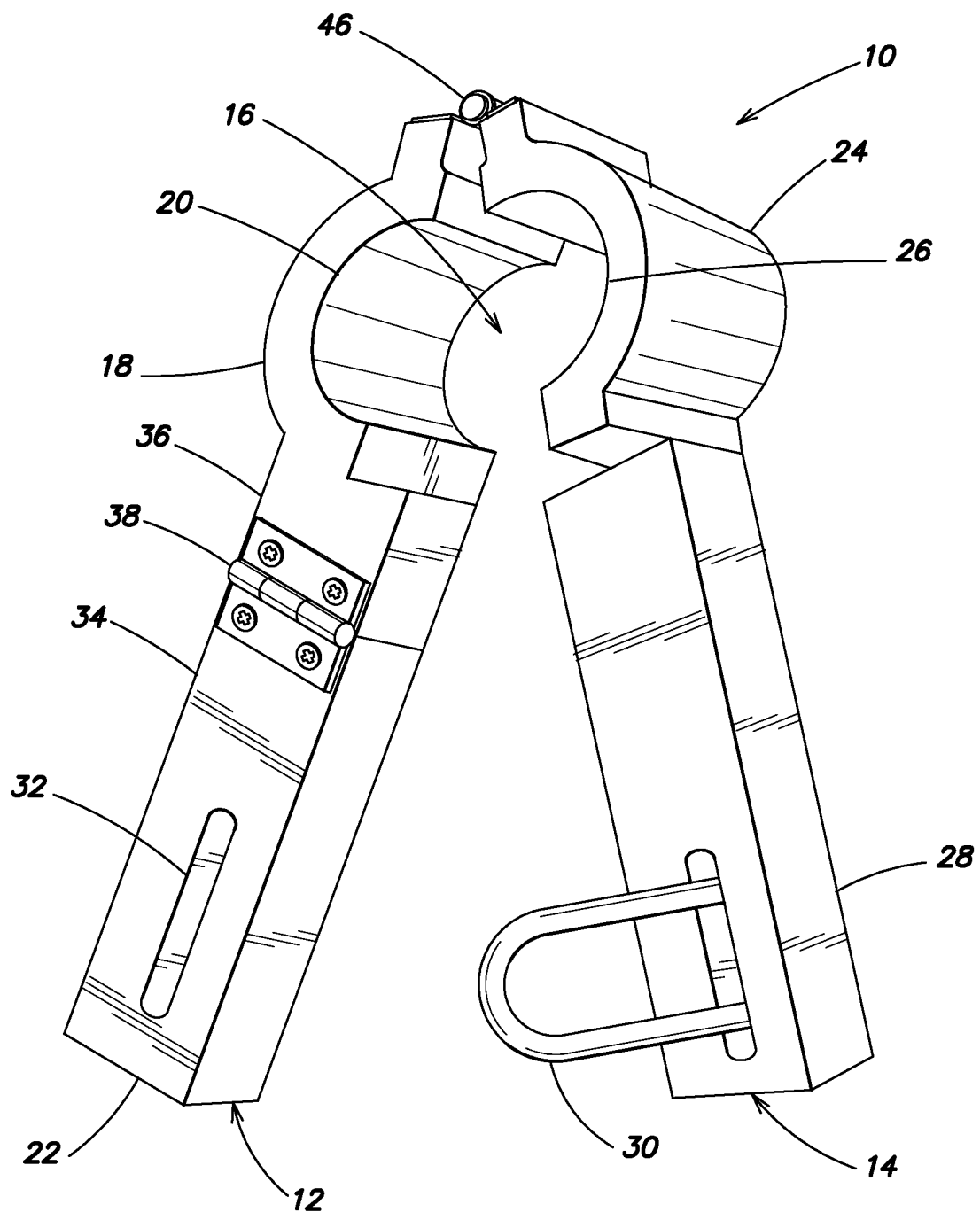
FIG. 1 is a perspective view of an apparatus in accordance with the invention in which arms thereof are in an open state.
Figure 3:
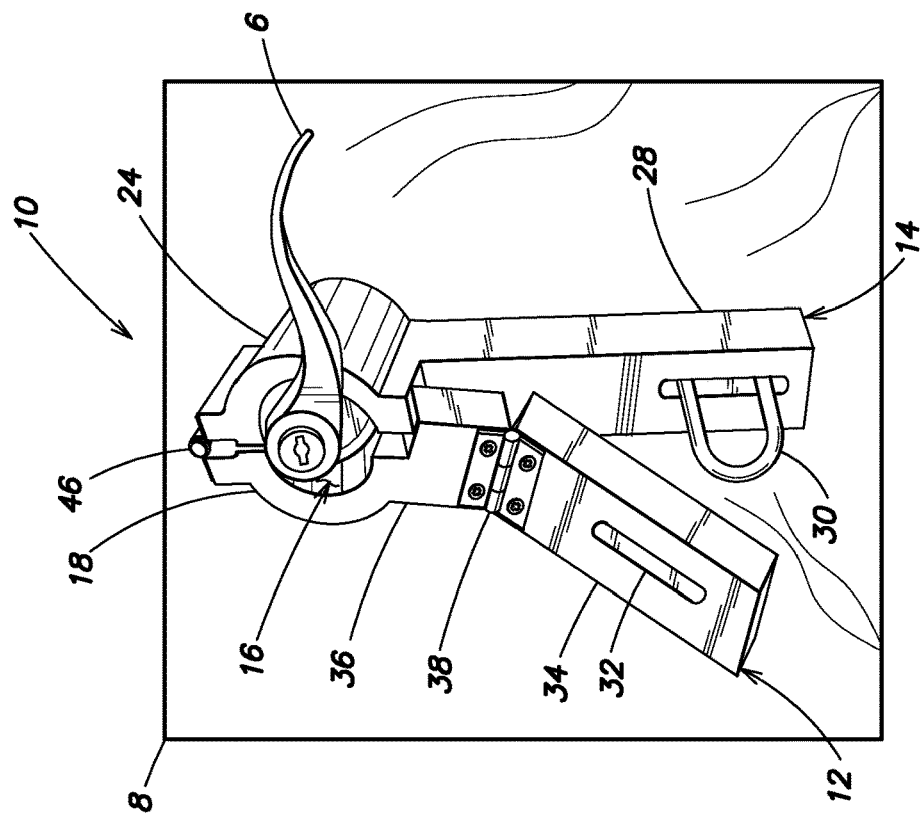
FIG. 3 shows an intermediate stage of attachment of the apparatus in accordance with the invention to the door lever.
Figure 2:
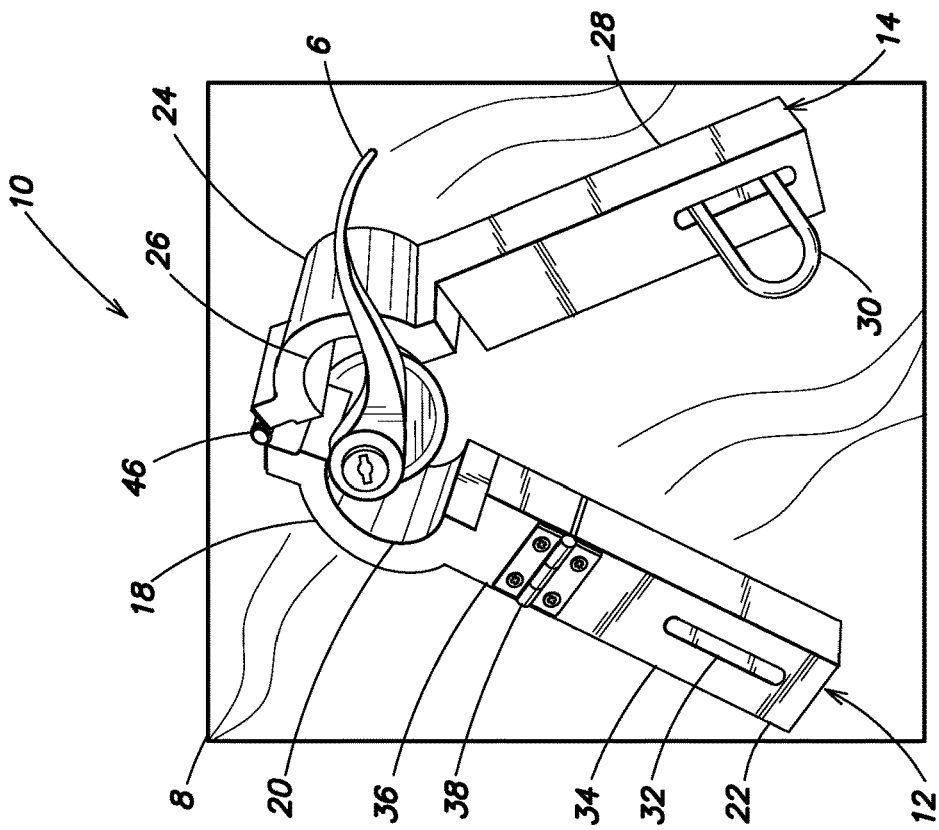
FIG. 2 shows the initial stage of attachment of the apparatus in accordance with the invention to a door lever.
Figure 4:
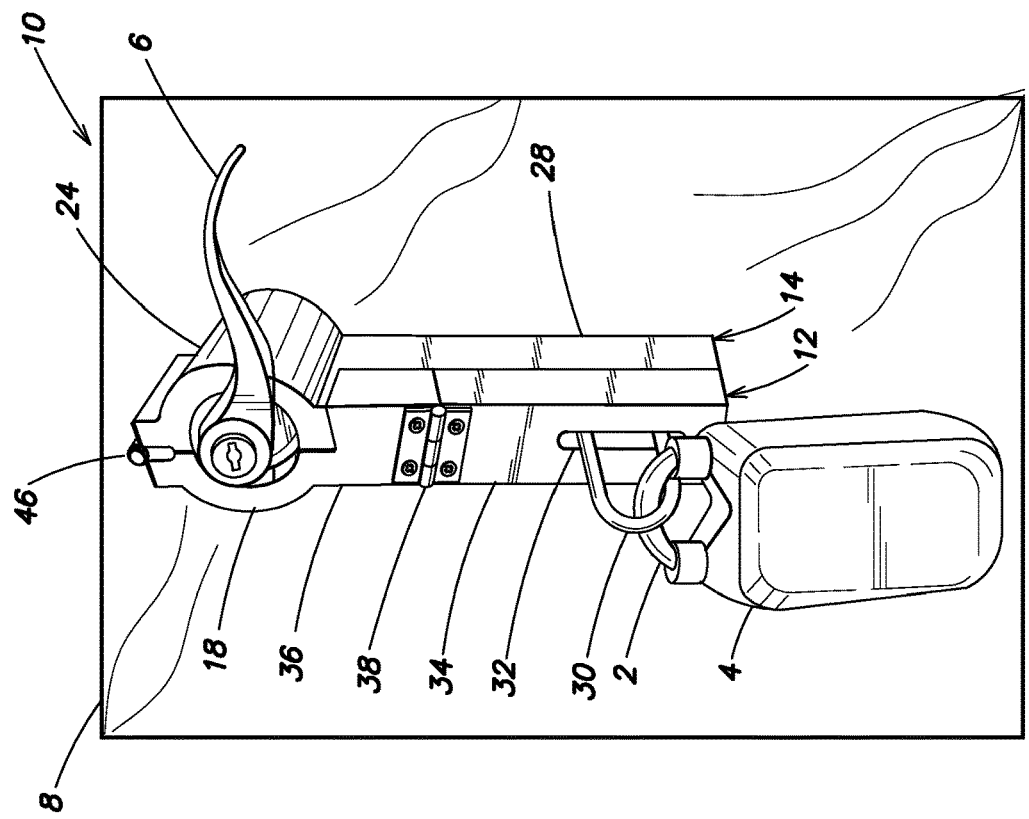
FIG. 4 shows the final stage of attachment of the apparatus in accordance with the invention to the door lever.
Figure 5:
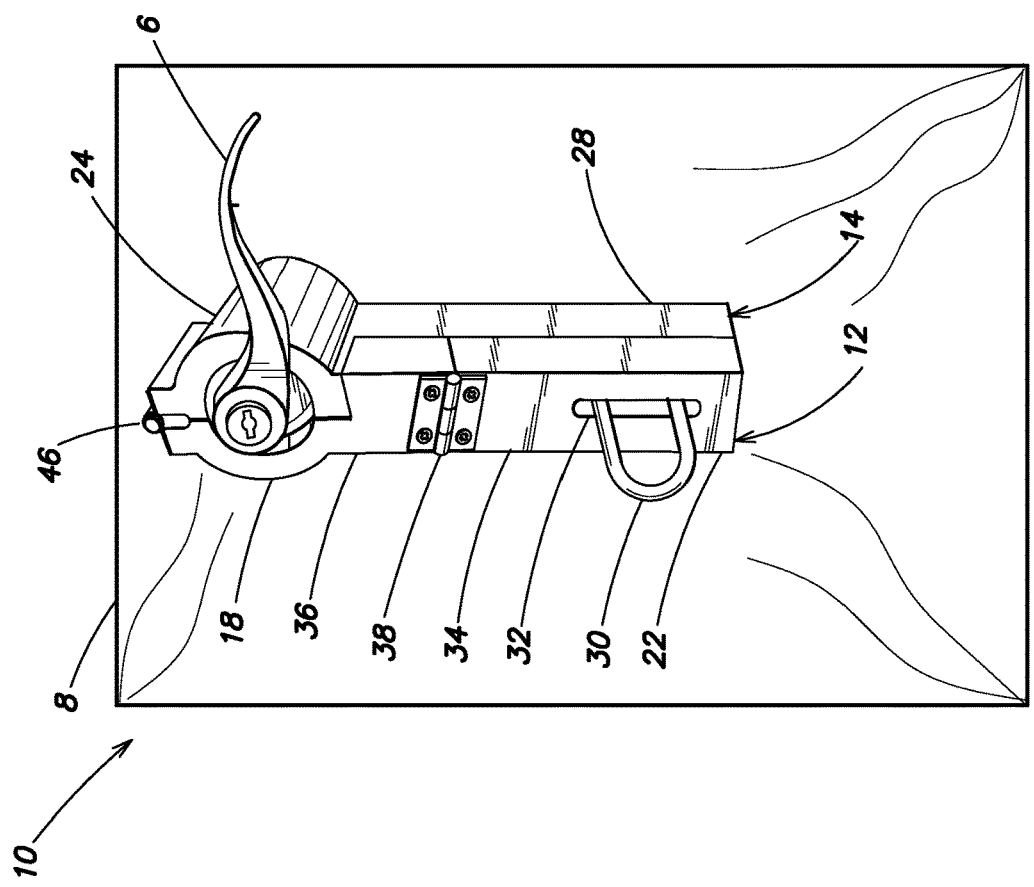
FIG. 5 is a view showing the apparatus in accordance with the invention in use with a lockbox.

Referring to the accompanying drawings wherein like reference numbers refer to the same or similar elements, FIGS. 1-5 show an apparatus 10 in accordance with the invention which generally, and in a preferred use, secures a lockbox 4 to a door lever 6 of a door 8. The apparatus 10 includes two members, which will be referred to as a first arm 12 and a second arm 14, that have a cooperating first, open state in which the first and second arms 12, 14 are at least partly separated from one another (FIGS. 1 and 2) and a cooperating second, closed state in which an aperture 16 is defined between them (FIGS. 3-5). In the open state, the first and second arms 12, 14 are positionable around the door lever 6 or removable from such a position (FIG. 2). (Identification of a preferred use of the apparatus 10 with a lock box 4 and door lever 6 is not intended to limit the invention in any manner whatsoever.) The arms 12, 14 may be considered to be structure that has a body and is generally elongate.

The first and second arms 12, 14 are movable between the first and second states, but in use are preferably locked in the second state to prevent movement of the first and second arms 12, 14 from the second state to the first state and thus, when the first and second arms 12, 14 are around the door lever 6, maintain the first and second arms 12, 14 around the door lever 6 (FIGS. 3-5). The mechanism that effects the locking of the first and second arms 12, 14 in the second state may be any type of conventional lock or lockbox and is not a required part of the invention. However, a lockbox assembly in accordance with the invention includes apparatus 10 and any type of lockbox 4.

When the lockbox 4 is secured to the apparatus 10 as shown in FIG. 5 (in a manner described below), the shackle 2 of the lockbox 4 is secured to the apparatus 10 which in turn is secured to the door lever 6, which is being used herein as an example of a door handle. The apparatus 10 would therefore maintain the lockbox 4 in a secured position on the door lever 6. The lockbox 4 would not be able to be removed while the apparatus 10 is in place and the shackle 2 of the lockbox 4 is secured to the apparatus 10. Realtors could thus insert a key to one of their listings into the lockbox 4 and using the apparatus 10, place the lockbox 4 onto the door lever 6 of the door 8 of this listing. Thereafter, to enable other realtors to show the listed property, they would be able to provide only the code to the lockbox 4 to enable the other realtors to access the key inside and use the key to access the listed property. Apparatus 10 prevents disengagement of the lockbox 4 for the door lever 6, and addresses the drawbacks of the prior art devices discussed above. Use of the apparatus 10 with electronic lockboxes is also possible.

Aperture 16 can be formed by the first and second arms 12, 14 in a variety of different ways, whether by a recess in only one of the arms 12 or 14 or by recesses in each arm 12, 14. As also disclosed below, the aperture 16 may be formed or defined by additional structure that enables its size to be adjustable. In the embodiment illustrated in FIGS. 1-5, the first arm 12 includes a head portion 18 at an upper region of the member that defines a recess 20 and an elongate bottom portion 22 below the head portion 18. The second arm 14 includes a head portion 24 at an upper region of the member that defines a recess 26 and an elongate bottom portion 28 below the head portion 24. The head portions 18, 24 constitute an upper portion of the apparatus 10 while the bottom portions 22, 28 constitute a lower portion of the apparatus 10.

Each recess 20, 26 has a generally semi-circular cross-section in the depth direction of the respective member but its shape can vary and is not limited to being semi-circular or even uniform in the depth direction of the first and second arms 12, 14. Recesses 20, 26 have a shape relative to one another to form the aperture 16 with a cylindrical form, but this is not a required feature and may vary for different embodiments. Head portions 18, 24 are therefore provided with a curved form.

The bottom portion 22 of the first arm 12 has an upper end region integral with the head portion 18, but may alternatively be connected thereto if formed from separate members. The bottom portion 28 of the second arm 14 has an upper end region integral with the head portion 24, but may alternatively be connected thereto if formed from separate members.

The structure that maintains the first and second arms 12, 14 in the second, closed state and prevents their movement from the second, closed state (FIGS. 3 and 4) to the first, open state (FIGS. 1 and 2) has various forms. The purpose of such structure is, when the first and second arms 12, 14 are around a door handle, to maintain the first and second arms 12, 14 around the door handle, whether a door lever or otherwise. This structure will generally be referred to as engagement means for engaging with the first and second arms 12, 14 and maintaining the first and second arms 12, 14 in the second, closed state and preventing movement of the first and second arms 12, 14 from the second, closed state to the first, open state. Thus, when the first and second arms 12, 14 are around a door handle, the engagement means maintain the first and second arms 12, 14 around the door handle. The engagement means do not necessarily include a locking structure, or other structure, that locks the first and second arms 12, 14 in the closed state.

The engagement means may be formed on only the first arm 12, only the second arm, or partly on both of the first and second arms 12, 14. The engagement means may be intrusive in that they require contact with only the first arm 12, only the second arm 14 or with both the first and second arms 12, 14. The specific engagement means illustrated in this application do not limit the scope of the claims.

In one embodiment, the engagement means comprise a generally U-shaped staple 30 in the bottom portion 28 of the second arm 14, and a slot 32 in the bottom portion 22 of the first arm 12 that is dimensioned to allow the staple 30 to pass therethrough. In this embodiment, the first arm 12 is in front of the second arm 14 when the first and second arms 12, 14 are in the closed state since it is better to have an exposed part of the staple 30 in front of the apparatus 10 to enable easy insertion of a shackle of a lock or lockbox through the opening of the staple 30 (the front being the side intended to be facing away from the door). Nevertheless, the staple 30, the slot 32 and the first and second arms 12, 14 could be configured such that the opening of the staple 30 is on a different side of the apparatus 10. The same variation may be made to the other embodiments of the apparatus 10 disclosed herein.

The staple 30 generally may also be considered a support for a lockbox and more specifically a support for a shackle of a lockbox.

The staple 30 has elongate, parallel legs connected to the bottom portion 28 and a curved portion connecting the legs extends in a direction toward the first arm 12 (FIG. 1). Staple 30 extends in a direction from the bottom portion 28 of the second arm 14 to enable it to pass through and extend beyond the slot 32 of the first arm 12, when the first and second arms 12, 14 are in their closed state. The extent to which the staple 30 extends beyond the slot 32 forward of the front surface of the bottom portion 22 is determined to allow a lock or more likely the shackle of a lockbox, to pass through the staple 30 and be secured around the staple 30 (FIG. 5).

To enable the staple 30 to pass through the slot 32, the bottom portion 22 of the first arm 12 is provided with a slotted part 34 connected to a base part 36 by a hinge 38 (FIG. 1). Slotted part 34 is slotted in the sense that it includes the slot 32. The slotted part 34 may be considered similar to a hasp, but is not required to be made from metal.

The staple 30 is passed through the slot 32 by, from when the first and second arms 12, 14 in the first, open state around the door lever 6 (FIG. 2), lifting the slotted part 34 upward to allow the first and second arms 12, 14 to be able to be positioned alongside one another (FIG. 3). Such a position is prevented in the open state when the slotted part 34 abuts against the staple 30 (FIG. 2). By lifting the slotted part 34 upward, the base part 36 can be moved alongside the bottom portion 28 of the second arm 14 and then the slotted part 34 can be lowered when the slot 32 aligns with the staple 30 (transition from FIG. 3 to FIG. 4). The bottom portions 22, 28 are thus alongside one another when the first and second arms 12, 14 are in the closed state.

When the first arm 12 is raised and the slotted part 34 is positioned and lowered over the staple 30, the first and second arms 12, 14 align one behind another and cannot spread out. In this position, the apparatus 10 is unable to open and slide off of or be removed from the door lever, or door knob. Locking the first and second arms 12, 14 in this position is also possible and preferred through use of a lock or lockbox whose shackle 2 is inserted through the exposed portion of the staple 30 (transition from FIG. 4 to FIG. 5).

The hinge 38 may be any type of hinge or other structure that provides for a rotational or pivotal connection of the slotted part 34 to the base part 36. As an example, the hinge 38 may be a non-removable hinge with two hinge parts (leaves), one of which is attached to the slotted part 34 and the other attached to the base part 36. The leaves may be permanently attachment, e.g., using screws that pass through apertures in each leaf, or may be incorporated or integrated into the design of the slotted part 34 and base part 36. The type and construction of the hinge 38 is not important the invention, only that the slotted part 34 is pivotable relative to the base part 36 via the hinge 38 (at least in this embodiment).

With respect to the material of the first and second arms 12, 14 of the apparatus 10, they may be made of a variety of materials, such as metal, and covered by a material that prevents damage to the door. For example, a protective covering or coating made of rubber or plastic would prevent scratching of the door and door handle when the apparatus 10 is installed.

Staple 30 may be secured to the bottom portion 28 in a variety of different ways, but regardless of which way, it is preferably secured thereto in a manner to prevent it from separating from the bottom portion 28, e.g., preferably permanently fixed to the bottom portion 28 of the second arm 14. It is possible to design the second arm 14 with an integral or incorporated staple 30.

Instead of fixing the staple 30 to the bottom portion 28, it is possible to use a staple unit 30A that is movable relative to the second arm 14. For example, as shown in FIG. 6, instead of fixing the staple 30 to the bottom portion 28 as in FIG. 1, the staple unit 30A is pivotally attached to the bottom portion 28, e.g., at its lower edge region. As pivotal attachment means, a hinge 40 may be used to pivotally attach an optional backplate 42 connected to the staple 30 (thereby forming the staple unit 30A) to the bottom portion 28. Hinge 40 is configured and positioned relative to a slot 44 in the bottom portion 28 to enable the staple 30 to pivot into the slot 44 and also into the slot 32 in the slotted part 34 of the first arm 12 when the slot 32 aligns with the slot 44 such that the staple 30 extends sufficiently beyond the slot 32 to allow, for example, the shackle of a lockbox to pass through the staple 30 and be secured around the staple 30.

In FIG. 7, the staple unit 30A, including its optional backplate 42, is not attached at all to the bottom portion 28, but rather is a free, loose component. Staple unit 30A is dimensioned such that, when inserted through the slots 32, 44, the staple 30 thereof extends sufficiently beyond the slot 32 to allow the shackle of a lockbox to pass through the staple 30 and be secured around the staple 30.

Although the embodiments in FIGS. 1-5 include a hinged first arm 12, it is also possible to construct the apparatus 10 without a hinged first arm, which first arm lacking a hinge is designated 12A in FIG. 8. First arm 12A is an elongate piece of material, e.g., metal with a protective coating or covering as mentioned above, and includes the slot 32, but not the hinge 38. Similar to FIG. 6, staple unit 30A is pivotally attached to the bottom portion 28, e.g., at its lower edge region, and as pivotal attachment means, hinge 40 is used to pivotally attach the optional backplate 42 to the bottom portion 28. The staple unit 30A is pivoted in the direction of arrow A into the slot 44 and aligning slot 32.

In FIG. 9, the staple unit 30A is not required to be attached to any part of the second arm 14, but rather can be a free, loose component (like in FIG. 7). A loose component is one which is not always connected to remaining parts of the apparatus 10. Staple unit 30A is dimensioned such that, when inserted through the slots 32, 44, the staple 30 thereof extends sufficiently beyond the slot 32 to allow the shackle of a lockbox to pass through the staple 30 and be secured around the staple 30. In this embodiment, both arms 12A, 14 lack a hinge component. As such, they may be rigid elongate members.

FIGS. 10 and 11 show use of skirts 52 situated on the lateral and bottom sides of the slotted part 34 that are configured to extend over the lateral and bottom sides of the bottom portion 28 when the first and second arms 12, 14 are in the closed state (see FIG. 11). These skirts 52 may be formed from the same material as the material of the slotted part 34, e.g., integral therewith, or from a separate and/or different material that is attached to the lateral and rear sides of the slotted part 34. Skirts 52 aid in positioning of the slotted part 34 over the bottom portion 28 because they define a three-sided receptacle into which the bottom portion 28 can be easily inserted as the slotted part 34 is pivoted over the staple 30.

Skirts 52 may be composed of a thin plate attached to the lateral and bottom sides of the slotted part 34 or a thin rim projecting rearward from the lateral and bottom edges of the rear-facing surface of the slotted part 34, or other comparable or functionally equivalent structure. One purpose of the skirts 52 is to form a U-shaped channel on the side of the slotted part 34 of the first arm 12 that faces the second arm 14 so that the second arm 14 is more easily retained in a pre-determined position against the first arm 12 when the first and second arms 12, 14 are in the closed state. Thus, skirts 52 generally represent means to aid in positioning of the slotted part 34 over the bottom portion 28.

Skirts 52 do not have to extend over the entire lateral and bottom sides of the slotted part 34 but may extend over only a portion thereof. The skirts 52 may also be fragmented into different parts and are not required to be situated on both of the lateral sides and bottom sides, but rather may be positioned on whichever sides are desired.

The first and second arms 12, 14 may be connected together to keep them together with in the first, open state.

For example, the first and second arms 12, 14 may be connected together at an upper edge region to enable the arms 12, 14 to pivot about this upper edge region between the first and second states while in continual connection to one another. To this end, connecting means are provided on the apparatus 10 to connect the first and second arms 12, 14 together to enable them to be manually moved between the first and second states. The connecting means encompass structure that connects the first and second arms 12, 14, together to enable them to have two positions, one in which it is possible to place the apparatus 10 over the part of the door handle to be received in the aperture 16 formed by the connection of the first and second arms 12, 14 (which position is referred to as the open position), and another position in which the apparatus 10 is configured to enable the first and second arms 12, 14 to be engaged with and preferably locked to one another (which position is referred to as the closed position). These connecting means may be any known connecting mechanism that functions to selectively connect two parts together. The parts do not have to be connected when in the open position, e.g., via a hinge, but could be completely separate when in the open position (see FIG. 12).

As an exemplifying, non-limiting embodiment of the connecting means, a hinge 46 may be provided at an upper edge regions of the first and second arms 12, 14. When pivoted into the open state about hinge 46, it is possible to bring the apparatus 10 over the part of the door lever 6 to be received in the aperture 16 through the space between the first and second arms 12, 14 (FIG. 2). The first and second arms 12, 14 are then pivoted into the closed state about hinge 46 to cause the part of the door lever 6 to be received in aperture 16 which is formed upon moving the first and second arms 12, 14 to their closed state. In the closed state, the first arm 12 is situated on the left side of the door lever 6 with the recess 20 alongside the part of the door lever 6 received in aperture 16 and the second arm 14 is situated on the right side of the door lever 6 with the recess 26 alongside the part of the door lever 6 received in aperture 16.

Hinge 46 may be a non-removable hinge with two planar hinge parts, called leaves, each attached to an upper surface of a respective one of the first and second arms 12, 14. The leaves each have knuckles through which a pin passes and enables pivotal movement of the leaves relative to one another, and thus pivotal movement of the first and second arms 12, 14 relative to one another. Attachment of the leaves to the first and second arms 12, 14 may be a permanent attachment, e.g., using screws that pass through apertures in each leaf into and through the upper surfaces of the head portion 18, 24, or may be incorporated or integrated into the design of the head portions 18, 24 of the respective first and second arms 12, 14. A cross-sectional view of the head portions 18, 24 including the hinge 46 is shown in FIG. 12.

FIG. 13 shows an alternative hinge 46A wherein the leaves are embedded into the head portions 18, 24 and not alongside the upper surface.

FIG. 14 shows connecting means that do not comprise a hinge, namely, wherein the connecting means comprise pins 48 on each head portion 18, 24 and which pins 48 cooperate with one another to provide a closed and secure state of the first and second arms 12, 14 (only the head portions 18, 24 of which are shown, with the bottom portions 22, 28 being any of the bottom portions disclosed herein). The pins 48 are removably attached to one another and can be forcibly separated from one another when installing and removing the apparatus 10. By suitable design of the dimensions of the apparatus 10, the pins 48 cannot be separated from one another to enable removal of the apparatus from the door lever 6 to which the apparatus 10 is attached when a lock or lockbox shackle is present in the staple 30.

FIG. 15 is a top view of another connecting means wherein the first and second arms 12, 14 are provided with an integrated hinge 50 formed by structure of the head portions 18, 24 themselves. The integrated hinge 50 can be replaced by any other structure that forms an integrated pivot structure, which structures are known to or readily ascertainable by those skilled in the art, and are considered to be encompassed by the invention.

To enable the apparatus 10 be used with variable-sized door levers 6 or other types of door handles, various mechanisms are provided to adjust the size of the aperture 16, referred to herein as adjusting means for adjusting a size of the aperture 16 to improve the retention of the apparatus 10 on the door lever 6. These mechanisms are generally configured to reduce the size of the aperture 16 from a largest possible size determined by the construction of the apparatus 10.

FIG. 16 shows the presence of a generally semi-circular plate 54 inward of each inner surface of the head portions 18, 24. The semi-circular plates 54 occupy a small portion of each recess 20, 26 defined by the head portions 18, 24, i.e., are situated on opposite sides of the aperture 16. The semi-circular plates 54 are configured and dimensioned to avoid interfering with one another when the apparatus 10 is in the closed state.

Adjustment of the position of the semi-circular plates 54 relative to the inner surfaces of the respective head portion 18, 24 is effected by tightening or loosening set screws 56 which results in the aperture 16 being larger or smaller depending on the direction of rotation of the set screws 56. Other known mechanisms to effect movement of a plate, to result in a change in the size of the aperture 16 in the invention, are also considered part of the invention.

In another embodiment, a functionally comparable or equivalent mechanism is integrated into the apparatus 10 which when rotated, moves the semi-circular plates 54 in and out, which the end result also being a variation in the size of the aperture 16. Adjustment of the size of the aperture 16 may be effected before the apparatus 10 placed over the door lever 6 or while the apparatus 10 is around the door lever 6.

Figure 17:
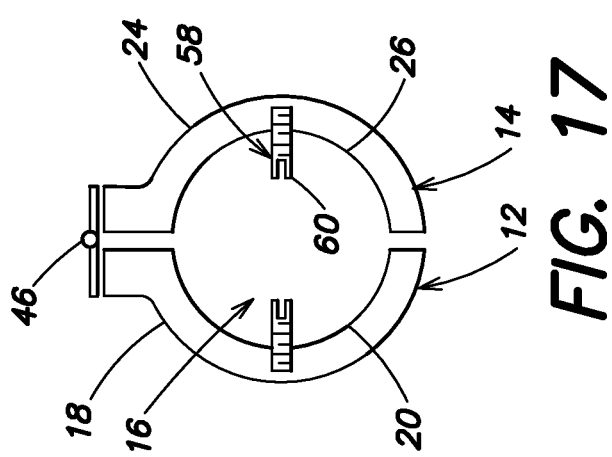

FIG. 17 shows another adjusting mechanism or means for adjusting the size of the aperture 16. In this embodiment, a respective rotatable set screw 58 is installed in each head portion 18, 24 and has an edge 60 projecting into the recess 20, 26 a distance that varies as a function of the rotation of the set screw 58. The set screws 58 are thus on opposite sides of the aperture 16, but not necessarily opposite one another. The user, when seeking to reduce the size of the aperture 16 from a larger, possibly initial setting, can place a screwdriver or other tool or instrument in a slot of the set screw 58 and rotate it until the edge 60 is positioned close to or against the door lever 6. The apparatus 10 would then be secured to the door lever 6.

In another embodiment, a functionally comparable or equivalent mechanism is integrated into the apparatus 10 or set screws 58 which when rotated, moves the set screws 58 in and out, which the end result also being a variation in the size of the aperture 16. Adjustment of the size of the aperture 16 via rotation of the set screws 58 may be effected before the apparatus 10 placed over the door lever 6 or while the apparatus 10 is around the door lever 6.

In this embodiment, adjustment of the set screws 58 can reduce the overall size of aperture 16, i.e., the size of the head hole, and provide a more secure attachment of the apparatus 10 to the door lever 6.

Figure 18:
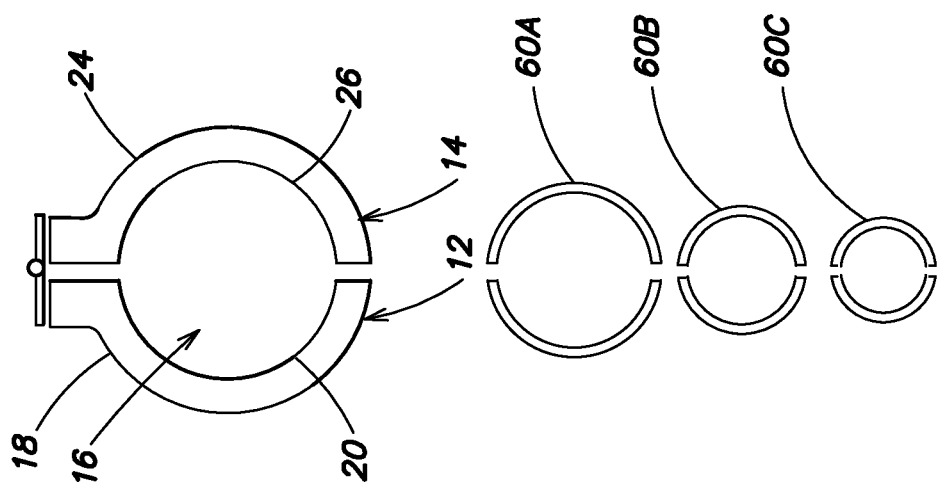

FIG. 18 shows yet another adjusting mechanism or means to adjust the size of the aperture 16 in order to provide a more secure attachment of the apparatus 10 to, for example, the door lever 6. Specifically, it is possible to provide variable-sized head hole inserts 60A, 60B, 60C that are inserted into the aperture 16, one into each recess 20, 26, and change the diameter of the aperture 16 when present therein. Inserts 60A, 60B, 60C may have a semi-circular cross-section, i.e., are semi-cylindrical, and the inserts of each pair are substantially identical. The specific one of the pairs of inserts 60A, 60B, 60C to use for each door handle is user-selectable and positionable around the door lever 6 depending on the diameter of the portion of the door lever 6 around which the apparatus 10 is to be positioned.

The inserts 60A, 60B, 60C can be easily inserted into the recesses 20, 26, and removed therefrom when desired. In contrast to the use of semi-circular plates and an adjustment mechanism as in the embodiment in FIG. 16, in this embodiment the inserts 60A, 60B, 60C may be loosely inserted into the recesses 20, 26 and secured in place around the door lever 6 when the first and second arms 12, 14 are moved into the closed state.

Figure 19:
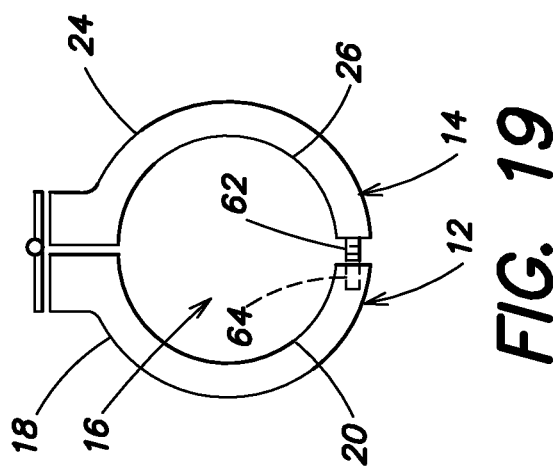
FIG. 19 shows a construction of the head portions that improves attachment of the head portions together in the closed state of the arms of the apparatus.

FIG. 19 illustrates a mechanism to improve the attachment of the head portions 18, 24 together. The surfaces of the head portions 18, 24 facing one another are provided with complementary mating structures, for example, a pin 62 and a pin hole 64. By inserting the pin 62 in the pin hole 64 upon closure of the first and second arms 12, 14, the head portions 18, 24 becomes less susceptible to being forced or pried open. The pin 62 and pin hole 64 represent means for releasably securing the head portions 18, 24 together when the apparatus 10 is in the closed state. Other known structures that provide this functionality are considered to be part of the invention, and one skilled in the art would understand how to incorporate them into the invention based on the disclosure herein.

The inventor contemplates combining any of the head portions 18, 24 of the first and second arms 12, 14 shown in FIGS. 12-19 with any of the bottom portions 22, 28 shown in FIGS. 6-11. As such, a large number of variations of the apparatus 10 are possible and considered within the scope of the invention. Moreover, the complementary mating structure shown in FIG. 19 may be used with and integrated into any of the other head portions disclosed herein.

It is possible to construct the apparatus 10 in various sizes, for example with various size apertures 16, various depths of the head portions 18, 24 (depth being the front to back distance), and various thickness of the head portions 18, 24 (thickness being the distance between the inner facing surface of the head portions 18, 24 that define the respective recess 20, 26 and the outer facing surfaces).

Apparatus 10 can thus be constructed to fit most door hardware styles including but not limited to door handles that are in the form of a lever, ball, biscuit, and tulip door knob styles.

There are numerous advantages of the invention. For example, in some embodiments, there are no loose components (aside from the embodiments of FIGS. 7 and 9). The staple 30 is attached to the second arm 14 and the first and second arms 12, 14 are attached to one another. A single, unitary assembly is thus formed which prevents loss of any particular piece and aids in maintaining the functionality of the apparatus 10.

Moreover, a characteristic of the invention believed to be unique when used to secure a lockbox to a door handle, and in the lockbox assembly of the invention, is that the lockbox can be secured to the door handle without having any part of the lockbox surround or encompass the door handle. That is, the shackle of a conventional lockbox typically is around the door handle when the lockbox is secured to a door handle. However, using apparatus 10, since there is a head portion 18, 24 on each arm 12, 14 which cooperate to surround the door handle (or least a part thereof), and then the bottom portions 22, 28 of the arms 12, 14 are situated below the respective head portion 18, 24, the shackle of the lockbox is engaged with the bottom portions 22, 28 below the head portions 18, 24 and therefore below the door handle. For example, the shackle of the lockbox can be attached to the staple 30 that projects through the slot 32 in the first arm 12, i.e., the shackle is inserted through an opening defined by the staple 30 in front of the front surface of the bottom portion 22 of the first arm 12. The lockbox is therefore entirely below the door handle (as clearly seen in FIG. 5). This is very advantageous since the lockbox, when secured to the apparatus 10 in turn secured to the door handle, should not interfere with the movement of the door handle to open or close the door.

Modifications of the apparatus 10 described above are contemplated. In one modification, the apparatus 10 is integrated into a shackle of, for example, a lockbox. In this case, instead of needing two components, i.e., a lockbox and the apparatus 10, a single component or lockbox assembly is provided and can be manufactured and sold as an integrated unit.

Another modification of the apparatus 10 involves the use of inserts that can be placed into the aperture 16 to change the shape and/or diameter of the aperture 16 and accommodate different shapes and diameters of door handles.

As described above, the apparatus 10 generally is used to secure a lockbox to a door handle and especially a door lever used as a door handle. However, this described use of the apparatus 10 is not intended to limit the invention and other uses are possible and should be considered within the scope and spirit of the invention.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. Apparatus, comprising:
a first arm having a head portion and a bottom portion below said head portion, said bottom portion of said first arm including a base part adjacent said head portion and a slotted part including a slot, said slotted part being pivotally connected to said base part;
a second arm having a head portion and a bottom portion below said head portion, said bottom portion of said second arm comprising a staple, said slotted part being pivotable between a position in which said staple extends through said slot and a position in which said staple is outside of said slot,
said first and second arms having a first, open state in which said head portions of said first and second arms are at least partly separated from one another, and a second, closed state in which an aperture is defined between said head portions of said first and second arms whereby said first and second arms are positionable around a door handle or removable from such a position when in the first, open state and said aperture is receivable of the door handle when said first and second arms are in the second, closed state,
whereby a lock engaged with said staple while said slotted part is in the position in which said staple extends through said slot maintains said first and second arms in the second, closed state and prevents movement of said first and second arms from the second, closed state to the first, open state and thus, when said first and second arms are around the door handle, maintains said first and second arms around the door handle.

2. The apparatus of claim 1, wherein said head portions of said first and second arms each include a recess and said recesses combine to form said aperture.

3. The apparatus of claim 1, wherein said bottom portions of said first and second arms are elongate and alongside one another when said first and second arms are in the second, closed state.

4. The apparatus of claim 1, wherein said staple has a U-shape and movement of said first arm in its entirety relative to said second arm is prevented when said slotted part is in the position in which said staple extends through said slot.

5. The apparatus of claim 1, wherein said staple is fixed to said bottom portion of said second arm.

6. The apparatus of claim 1, wherein said bottom portion of said second arm includes a slot and said staple is pivotally attached to said bottom portion of said second arm and pivotable between a position partly in said slot of said bottom portion of said second arm and a position out of said slot of said bottom portion of said second arm.

7. The apparatus of claim 1, wherein said bottom portion of said second arm includes a slot and said staple is separable from said bottom portion of said second arm and movable between a position partly in said slot of said bottom portion of said second arm and a position out of said slot of said bottom portion of said second arm.

8. The apparatus of claim 1, further comprising skirts on lateral and bottom sides of said slotted part and configured to extend over lateral and bottom sides of said second arm.

9. The apparatus of claim 1, further comprising connecting means for connecting said first and second arms together above said aperture.

10. The apparatus of claim 9, wherein said connecting means comprise a hinge at an upper edge region of said head portions of said first and second arms such that said first and second arms are connected together in both the first, open and second, closed states.

11. The apparatus of claim 9, wherein said connecting means comprise pins at an upper edge region of said head portions of said first and second arms such that said first and second arms are connected together in only the second, closed state and completely separable from one another in the first, open state.

12. The apparatus of claim 1, further comprising adjusting means for adjusting a size of said aperture, said adjusting means comprising:
a pair of semi-circular plates on opposite sides of said aperture that are coupled to said head portions of said first and second arms and adjustable in their position relative to said head portions of said first and second arms; or
one of a plurality of pairs of user-selectable variably-sized inserts in said aperture.

13. The apparatus of claim 1, further comprising complementary mating structure on opposed, facing surfaces of said head portions of said first and second arms below said aperture and which separate from one another when said first and second arms are in the first, open state and cooperate to secure the head portions together when said first and second arms are in the second, closed state.

14. The apparatus of claim 13, wherein said mating structure comprises a pin projecting from one of said opposed, facing surfaces and a pin hole in the other of said opposed, facing surfaces receivable of said pin.

15. The apparatus of claim 1, wherein said staple has a U-shape with a parallel part fixed to said bottom portion of said second arm and a curved part extending beyond a surface of said bottom portion of said first arm when said staple extends through said slot of said slotted part of said first arm to enable attachment of the lock to said staple.

16. The apparatus of claim 1, further comprising adjusting means for adjusting a size of said aperture, said adjusting means comprising a pair of set screws on opposite sides of said aperture that are coupled to said head portions of said first and second arms and adjustable in their position relative to said head portions of said first and second arms.

17. Lockbox assembly, comprising:
a lockbox including a housing defining a compartment for storing a key, and a shackle partly separable from said housing, said lockbox having a code that enables access to said compartment; and
an apparatus to attach said lockbox to a door handle, said apparatus comprising:
  a first arm having a head portion and a bottom portion below said head portion; and
  a second arm having a head portion and a bottom portion below said head portion, said first and second arms having a first, open state in which said head portions of said first and second arms are at least partly separated from one another, and a second, closed state in which an aperture is defined between said head portions of said first and second arms, said first and second arms being positionable around the door handle or removable from such a position when in the first, open state and said aperture is receivable of the door handle when said first and second arms are in the second, closed state;
  at least one of said first and second arms having structure that engages with said shackle to maintain said first and second arms in the second, closed state and prevent movement of said first and second arms from the second, closed state to the first, open state and thus, when said first and second arms are around the door handle, maintain said first and second arms around the door handle.

18. Apparatus, comprising:
a first arm having a head portion and a bottom portion below said head portion, said bottom portion of said first arm including a slot;
a second arm having a head portion and a bottom portion below said head portion, said bottom portion of said second arm comprising a slot and a staple pivotally attached to said bottom portion of said second arm and pivotable between a position extending through said slot of said bottom portion of said first arm and through said slot of said bottom portion of said second arm and a position out of said slot of said bottom portion of said second arm,
said first and second arms having a first, open state in which said head portions of said first and second arms are at least partly separated from one another, and a second, closed state in which an aperture is defined between said head portions of said first and second arms whereby said first and second arms are positionable around a door handle or removable from such a position when in the first, open state and said aperture is receivable of the door handle when said first and second arms are in the second, closed state,
whereby a lock engaged with said staple while said staple extends through said slot of said bottom portion of said first arm and through said slot of said bottom portion of said second arm maintains said first and second arms in the second, closed state and prevents movement of said first and second arms from the second, closed state to the first, open state and thus, when said first and second arms are around the door handle, maintains said first and second arms around the door handle.

19. The apparatus of claim 18, wherein said staple has a U-shape with a parallel part pivotally attached to said bottom portion of said second arm.

20. The apparatus of claim 18, wherein said bottom portion of said first arm includes a slotted part including said slot of said first arm and a base part adjacent said head portion, said slotted part being pivotally connected to said base part to enable said slotted part to be pivotable between a position in which said staple extends through said slot of said first arm and a position in which said staple is outside of said slot of said first arm.

* * * * *